US008041032B2

(12) United States Patent
Katoozi et al.

(10) Patent No.: US 8,041,032 B2
(45) Date of Patent: Oct. 18, 2011

(54) SYMMETRIC KEY ENCRYPTION SYSTEM WITH SYNCHRONOUSLY UPDATING EXPANDED KEY

(75) Inventors: Mehdi Katoozi, Issaquah, WA (US); George D. Jelatis, Minneapolis, MN (US)

(73) Assignee: Cardiac Pacemakers, Inc., St. Paul, MN (US)

( * ) Notice: Subject to any disclaimer, the term of this patent is extended or adjusted under 35 U.S.C. 154(b) by 1232 days.

(21) Appl. No.: 11/207,286

(22) Filed: Aug. 19, 2005

(65) Prior Publication Data

US 2007/0053516 A1 Mar. 8, 2007

(51) Int. Cl.
*H04L 9/16* (2006.01)
(52) U.S. Cl. .......................................... 380/37
(58) Field of Classification Search .................. None
See application file for complete search history.

(56) References Cited

U.S. PATENT DOCUMENTS

| 6,304,658 | B1 | 10/2001 | Kocher et al. | |
|---|---|---|---|---|
| 6,539,092 | B1 | 3/2003 | Kocher et al. | |
| 6,564,104 | B2 * | 5/2003 | Nelson et al. | 607/60 |
| 6,980,795 | B1 * | 12/2005 | Hermann et al. | 455/410 |
| 7,127,613 | B2 * | 10/2006 | Pabla et al. | 713/171 |
| 7,133,525 | B1 * | 11/2006 | DeGregorio et al. | 380/244 |
| 7,685,415 | B2 * | 3/2010 | Douceur et al. | 713/150 |
| 2003/0039357 | A1 * | 2/2003 | Alten | 380/46 |
| 2004/0228483 | A1 * | 11/2004 | Henry et al. | 380/37 |

OTHER PUBLICATIONS

NIST, DES Modes of Operation, Dec. 2, 1980, Federal Information Processing Standards Publication 81.*
NIST, Advanced Encryption Standard (AES), Nov. 26, 2001, Federal Information Processing Standards Publication 197.*
Dworkin, Morris, "Reccomendation for Block Cipher Modes of Operation: Methods and Techniques", *NIST Special Publication 800-38A*, National Institute of Standards and Technology: Technology Administration: U.S. Department of Commerce, (2001), 66 pgs.

\* cited by examiner

*Primary Examiner* — Gilberto Barron, Jr.
*Assistant Examiner* — Simon Kanaan
(74) *Attorney, Agent, or Firm* — Schwegman, Lundberg & Woessner, P.A.

(57) ABSTRACT

A method, apparatus, and system of encryption, including embedding reconfiguration information within a ciphertext block destined for a decryptor. The decryptor identifies the reconfiguration information, extracts such information, and uses it to alter a pre-cipher, which is used for decryption. The encryptor alters its pre-cipher synchronously with the decryptor.

25 Claims, 8 Drawing Sheets

SYMMETRIC KEY ENCRYPTION SYSTEM WITH SYNCHRONOUSLY UPDATING EXPANDED KEY

TECHNICAL FIELD

This document relates to communication systems for implantable medical devices and systems with which such devices communicate, and more particularly to a symmetric key encryption system utilizing an expanded key that is updated or altered synchronously from time to time.

BACKGROUND

Increasingly, implantable medical devices, such as cardiac rhythm management devices, detect a wide range of physiological and/or behavioral data that may be useful to health care providers servicing the individual in which the device is implanted. For example, a cardiac rhythm management device may record information regarding the physical exertion of a patient, the patient's rate of breathing, heart sounds generated by the patient, and so on. Such information may be transmitted from the implanted device to a programmer in a doctor's office, for example. Alternatively, such information may be transmitted to an access point for a wireless network, whereupon the data may be stored in a datastore for later retrieval by a physician or other health care provider. The physician may access the data, using a web browser, for example, to remain updated about the patient's condition.

In such a scheme, it may be important that communication between the implanted medical device and the access point (or other external system, such as a computer, personal digital assistant, or programmer) is confidential and secure. To that end, encryption schemes may be employed to attain the desired security. Thus, before transmission from the implanted device, data is encrypted, and may be decrypted by the appropriate receiving device (and vice versa).

SUMMARY

Different varieties of encryption schemes may be employed in such a setting. However, certain design constraints influence the selection of an appropriate scheme. Because the medical device is implanted in a human being and typically cannot have its battery recharged without its removal, the chosen scheme should employ relatively little computation, so as to consume minimal current from the device's battery. Also, the chosen encryption scheme should not consume so much overhead that the effective bandwidth of the communication channel between the device and the external system is drastically eroded. Additionally, because the data being protected relates to personal health information, the chosen encryption scheme should provide a high degree of confidence that the secrecy of the data communication will not be compromised.

This document describes, among other things, a symmetric key encryption system utilizing an expanded key that is updated or altered synchronously from time to time.

DETAILED DESCRIPTION

Figure 1:
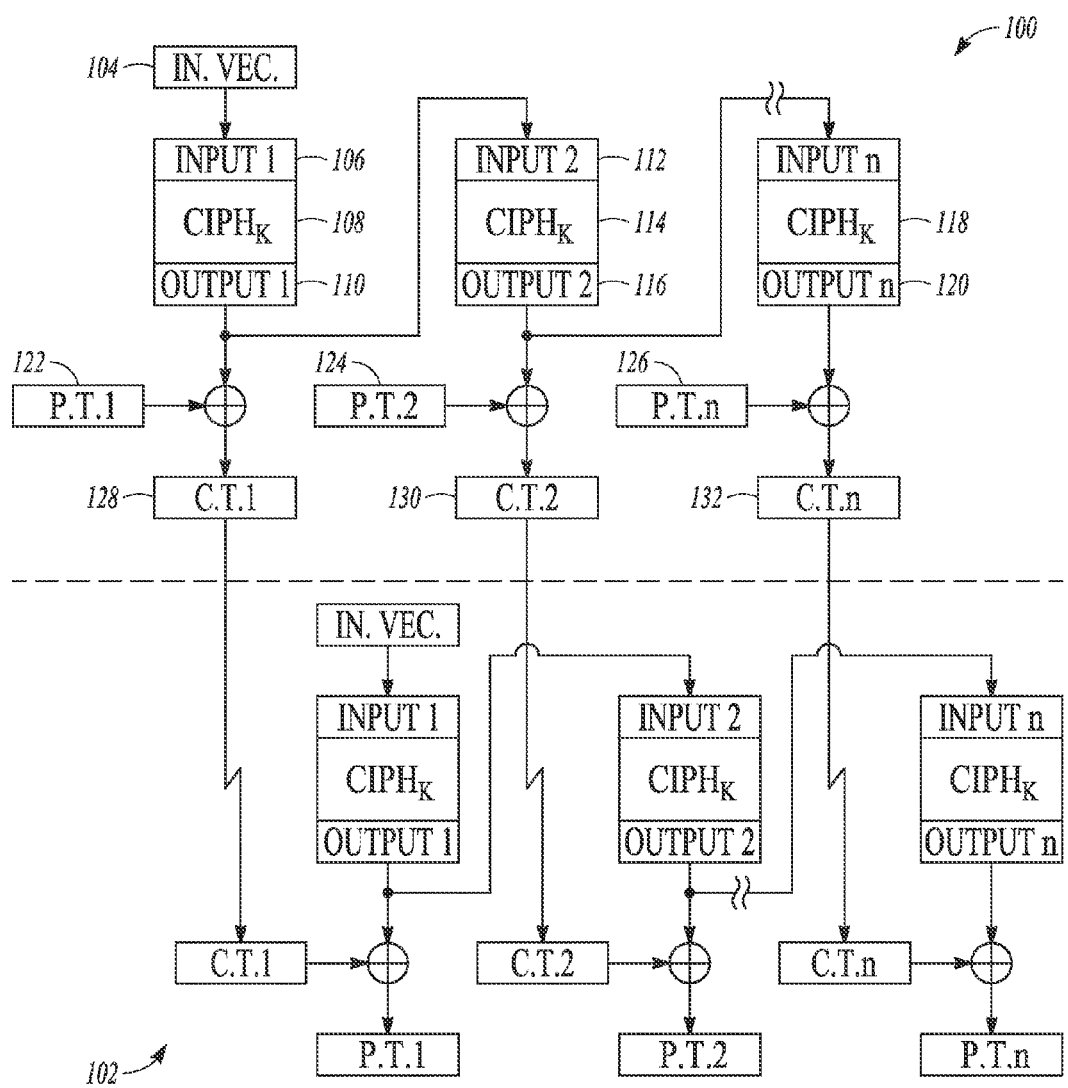
FIG. 1 depicts an example of an encryption/decryption scheme.

FIG. 1 depicts an encryption/decryption scheme. A dashed line separates the encryption system 100 from the decryption system 102. In this example, the encryption system 100 and decryption system 102 are identical in the sense that the encryption function employed by the encryption system 100 serves as the inverse of itself, and may therefore be used as a decryption function.

For encryption, an input vector 104 is provided to an input stage 106 of a first cipher block 108. The input vector 104 may, in principle, be of any size, but in certain examples is 128 bits in length. For the sake of illustration, the examples herein assume a cipher key (introduced below) and input vector length of 128 bits, although this is not necessary.

The input vector is held at an input stage 106 of a first cipher block 108, and is operated upon by a cipher function (executed by cipher block 108), in order to create a value held in an output stage 110. The first cipher block 108 performs at least two functions: (1) it performs a key expansion function; and (2) it performs the cipher function. The cipher function uses the output from the key expansion function to transform the initialization vector 104 into an output that is held in the output stage 110.

Figure 2:
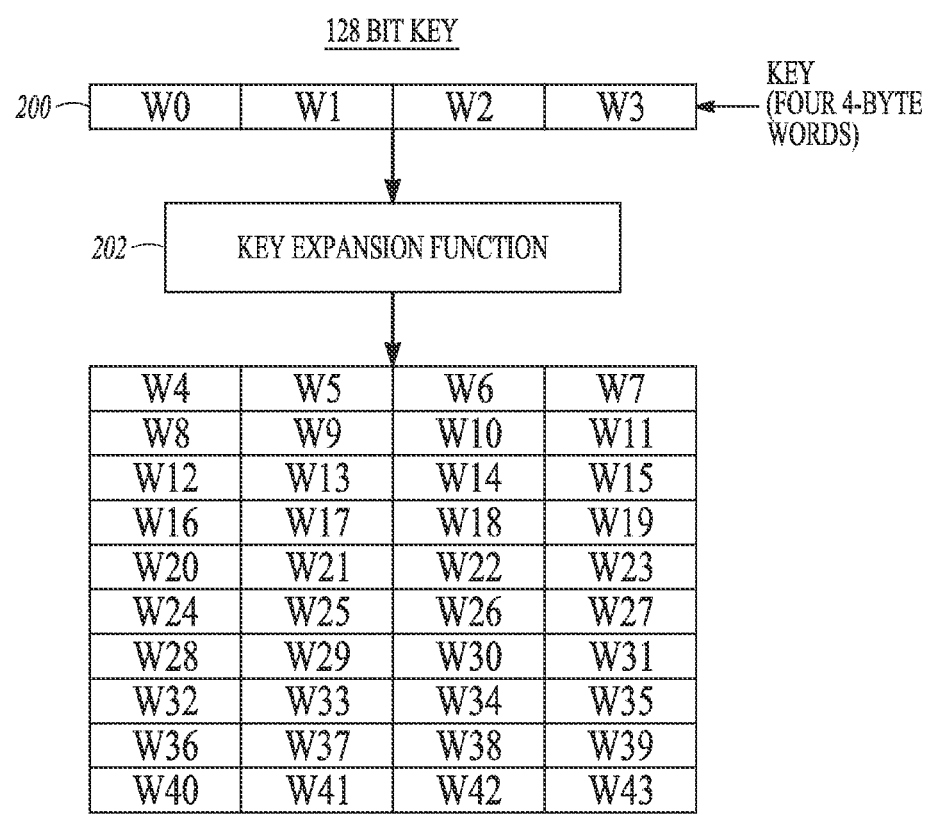
FIG. 2 depicts an example of operation of a key expansion function.

In performing the key expansion function, a key is operated upon by a key expansion function, as depicted in FIG. 2. In FIG. 2, the key is denoted by reference numeral 200, and is depicted as having four 4-byte words w[0], w[1], w[2], and w[3]. In one example, the four 4-bite words w[0], w[1], w[2], and w[3] of the cipher key 200 are operated upon by the key expansion function 202 to create forty additional 4-byte words w[4]-w[43]. The key expansion function 202 is recursive in nature. This means that a given 4-byte word w[i] is the function of the preceding word w[i-1] and the word 4, 6, or 8 positions earlier, depending upon the length of the input vector 200. For a 128 byte cipher key 200, a word w[i] is a function of the preceding word w[i-1] and the word four positions earlier, w[i-4]. In one example, the key expansion function 202 operates in accordance with Advanced Encryption Standard, Federal Information Processing Standards Publication 197 (AES FIPS PUB 197), published Nov. 26, 2001, which is incorporated by reference herein in its entirety. The key expansion function of FIG. 2 may therefore be referred to herein as an "AES key expansion function."

The use of the additionally created or "expanded" words w[4]-w[43] is discussed below. Together, the words w[0], w[1], w[2], and w[3] of the cipher key 200 and the expanded words w[4]-w[43] may be referred to as "round keys." In other words, words w[0]-w[3] make up one round key, words w[4]-w[7] make up another round key, and so on. Thus each round key includes four 4-byte words.

Figure 3:
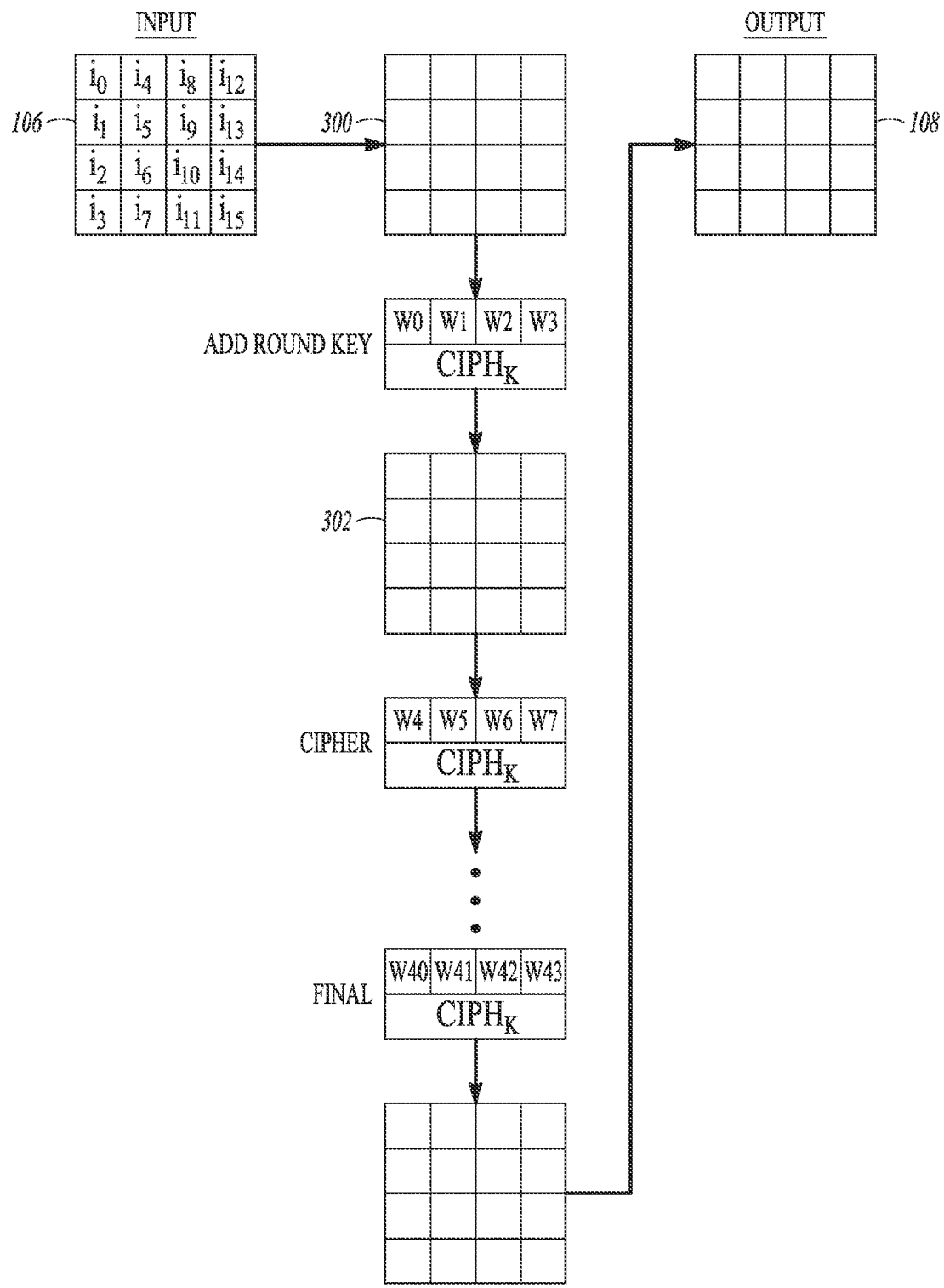
FIG. 3 depicts an example of operation of a cipher function.

The cipher block 108 (FIG. 1) performs a cipher function on the input vector 104 held in the input stage 106 of the block 108, thereby generating an output (of the same length as the input vector 104), which is held in the output stage 110. One example of the operation of the cipher function is depicted in FIG. 3.

The cipher function makes use of an input stage 106 (also depicted in FIG. 1), a state stage 300, and an output stage 108 (again, also depicted in FIG. 1). Initially, the contents of the input stage 106 are copied into the state stage 300. The copying may be performed in such a way that $s[r,c]=i[r+4c]$, where r designates a row of a matrix, and c designates column of the matrix. Once copied into the state stage 300, a round key w[0]-w[3] is added to the state stage, leaving the state stage in a first intermediate state 302. Thereafter, the following process is iterated nine times (or eleven or thirteen times, depending upon the length of the cipher key): (1) the state stage undergoes a byte substitution, using a substitution table; (2) the rows of the state stage are shifted by varying offsets; (3) the data within each column of the state stage is mixed; and (4) a round key is added to the state stage. With each iteration, a subsequent round key is used for the fourth step (round key addition). In other words, in the first iteration, the round key defined by words w[4]-w[7] is used. In the second iteration, the round key defined by words w[8]-w[11] is used, and so on. Finally, after the nine iterations, the state stage undergoes a final state change by virtue of execution of the following process: (1) the state stage undergoes a byte substitution, using a substitution table; (2) the rows of the state stage are shifted by varying offsets; and (3) a round key is added to the state stage. For the round key addition in the final step, the round key defined by words w[40]-w[43] is used. The outcome of this final state stage is then copied to the output stage 110. One example of the byte substitution, row shift, column mixing, and round key addition is included in AES FIPS PUB 197. The process described with reference to FIG. 3 may therefore be referred to as an "AES cipher function."

In FIG. 1, the output stage 110 of the first cipher block is provided to the second cipher block 114, and is copied to its input stage 112. Upon receiving the data in its input stage 112, the second cipher block performs the previously mentioned AES cipher function upon the data therein, using round keys generated via the AES key expansion function using the cipher key as its argument. The final state stage is again copied to the output stage 116, which is provided to the input stage of the next cipher block, and so on, until each of the output stages 110, 116, and 120 of each of the n cipher blocks 108, 114, and 118 contains data. Collectively, the set of data in each of the output stages 110, 116, and 120 may be referred to as the "pre-cipher."

When each of the output stages 110, 116, and 120 contains data, a set of plaintext blocks 122, 124, and 126 are received by the encryptor 100. Collectively, the set of plaintext blocks received by the encryptor 100 can be referred to as the "data message" or simply "the message." During a communication session, many messages may be communicated between an encryptor and a decryptor.

In the illustrated example, there exists a one-to-one correspondence between the plaintext blocks 122, 124, and 126 and each cipher block 108, 114, and 120. As a specific example, the output stage of each cipher block 108, 114, and 120 is used to encrypt one plaintext block 122, 124, and 126. In the illustrative example of FIG. 1, the output stage 110 of cipher block 108 is used to encrypt plaintext block 122, by means of a bit-wise exclusive-OR operation (i.e., the first bit of plaintext block 122 is exclusive-OR'ed with the first bit of the output stage 110, the second bit of plaintext block 122 is exclusive-OR'ed with the second bit of the output stage 110, and so on). Similarly, the output stage 116 of cipher block 114 is used to encrypt plaintext block 124, by means of a bit-wise exclusive-OR operation, and so on. Thus, each plaintext block 122, 124, and 126 is converted into a ciphertext block 128, 130, and 132.

The encryptor 100 uses an exclusive-OR operation to accomplish its encryption. Because an exclusive-OR operation serves as its own inverse function (a bit exclusive OR'ed with another bit twice yields its original value), the encryptor 100 may be repeated in its identical form as a decryptor 102. Thus, the decryptor 102 is typically identical in structure and operation to the encryptor 100. In other words, the decryptor receives the same input vector 104 and cipher key, uses the same AES key expansion function and AES cipher function in each of its cipher blocks, creates the same pre-cipher, and exclusive-OR's the cipher text with the pre-cipher to create the plaintext.

Figure 4:
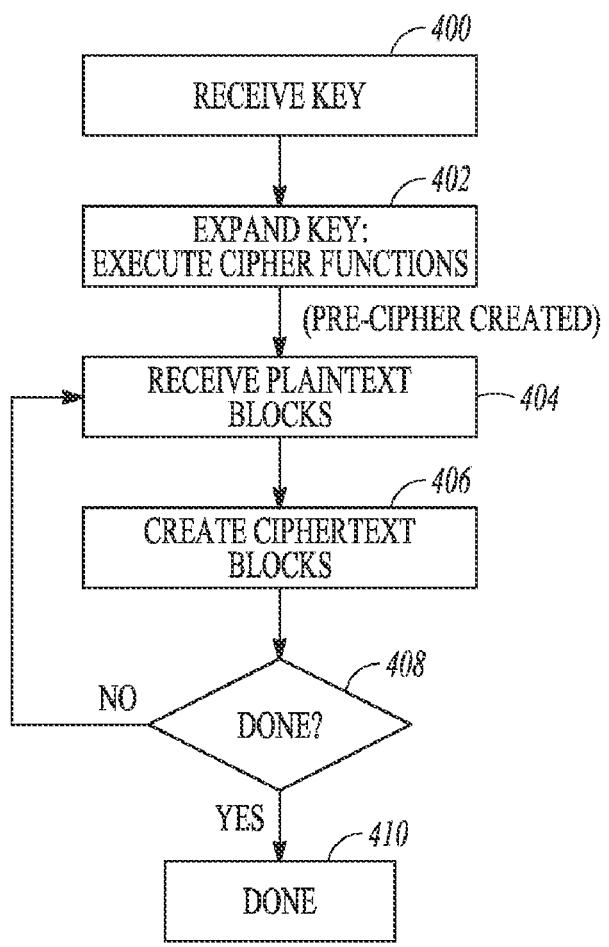
FIG. 4 depicts a summary of the operation of the encryption/decryption scheme of FIG. 1.

FIG. 4 summarizes the operation of the encryptor 100 and decryptor 102. Initially, the encryptor/decryptor 100/102 receives a key (input vector), as shown in operation 400. Optionally, the encryptor may also receive an initialization vector. Alternatively, the encryptor/decryptor may always use the same initialization vector (i.e., it may be embedded within the hardware/firmware of the encryptor/decryptor as a constant value). Then, at the encryptor/decryptor's 100/102 first cipher block, the key is expanded using the AES expansion function, and the resulting round keys are used by the AES cipher function to operate upon the initialization vector, thereby yielding an output. The output is fed to the second cipher block. The second cipher block uses such output to generate its own output, and so on. This propagation tactic is used until each cipher block has generated an output (i.e., until a complete pre-cipher has been generated), as shown in operation 402. At this point, the encryptor 100 is ready to encrypt plaintext blocks, and the decryptor is ready to decrypt ciphertext blocks. Thus operations 400 and 402 cooperate to prepare an encryptor/decryptor to operate by having generated a pre-cipher.

Next, a set of n plaintext/ciphertext blocks is received by the encryptor/decryptor 100/102, as shown in operation 404. Each cipher block operates upon a plaintext/ciphertext block to create a ciphertext/plaintext block (operation 406). Then, operation 408 determines whether more ciphertext/plaintext blocks are to be decoded/encoded. If so, control returns to operation 404, and an additional set of ciphertext/plaintext blocks are received and decoded/encoded otherwise, the process exits at 410. Thus, in the context of encryption, operations 404, 406, and 408 cooperate to encrypt a set of n plaintext blocks.

The flow of FIG. 4 presents a consideration. Consider a set of mn plaintext blocks to be encrypted. In such a circumstance, the loop defined by operations 404, 406, and 408 is traversed m times, with the same pre-cipher being used for encryption with each of the m iterations. By using the same pre-cipher to encrypt multiple messages, the security of the transmission may be jeopardized. For example, if an attacker were to know any of the bytes in any of the messages, then all corresponding bytes in any of the other messages could be readily determined. Thus, in general, multiple usage of a single pre-cipher may jeopardize secrecy.

Figure 5:
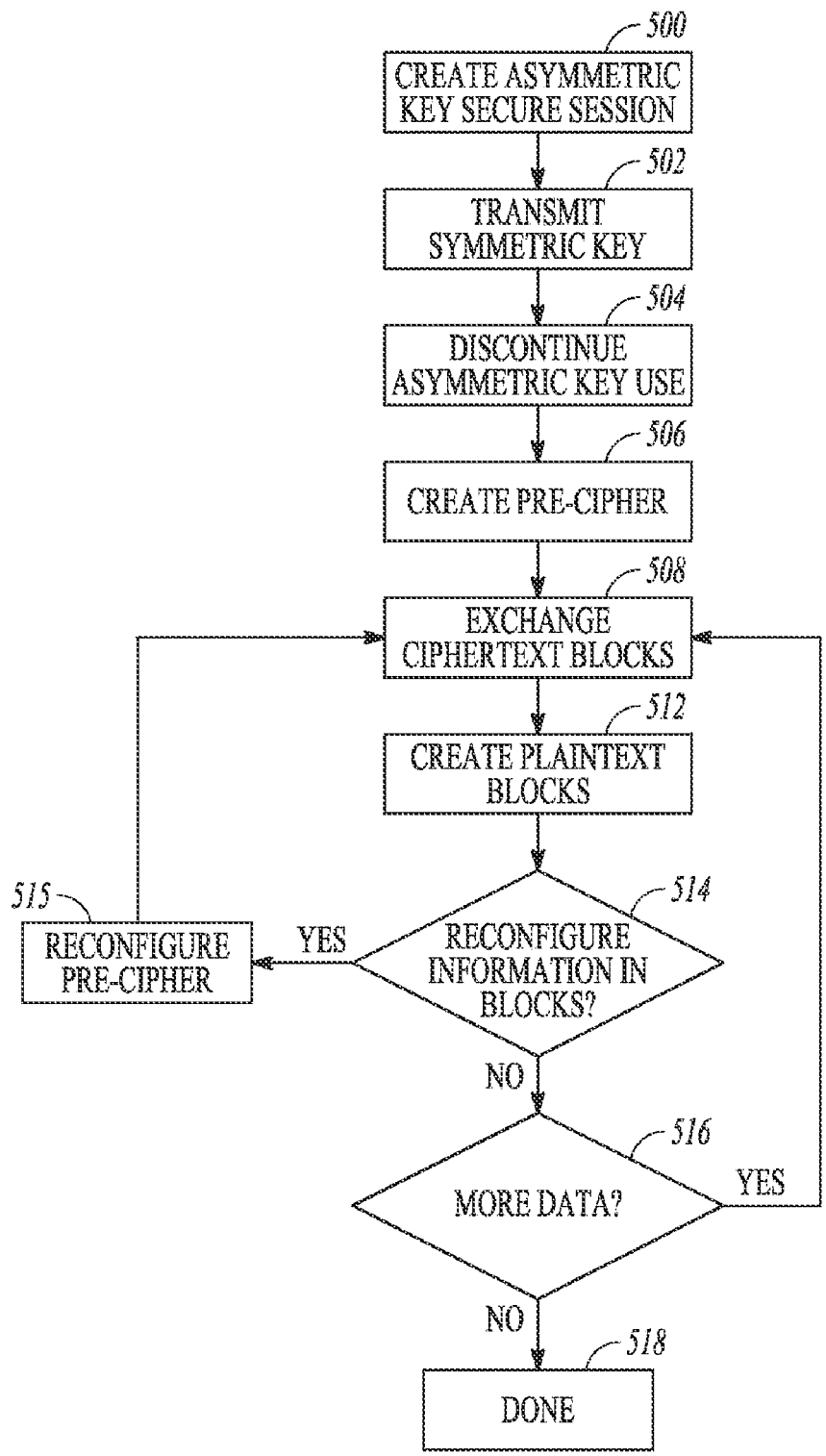
FIG. 5 depicts an example of a method of decryption.

FIG. 5 depicts a method of decryption that addresses this consideration. The method of FIG. 5 begins with the creation of a secure communication session, as shown in operation 500. The session may be secured by the use of asymmetric key cryptography, for example. Briefly, each communicating device discloses a public key to the other device, and retains a private key. A device may use the other's public key to encrypt a message destined for the other device. A receiving device decrypts the message with the private key. Such an encryption scheme is expected to be secure. However, this scheme consumes a great deal of computational power and time. Therefore, this encryption scheme is not employed for transmission of all data.

Once the secure communication session has been established, a cipher key is exchanged, as shown in operation 502. Typically, in the context of an implantable medical device system, a programmer unit would generate a cipher key and transmit the cipher key to the implantable medical device (such as a cardiac rhythm management device). Optionally, an initialization vector may be exchanged during the course of the secure session. Thereafter, use of the asymmetric key is discontinued. (operation 504).

Next, the pre-cipher is created, based on the initialization vector and cipher key (e.g., using the aforementioned AES key expansion function and AES cipher function), as shown in operation 506. At this point, the encryptor/decryptor are ready to exchange data. Therefore, a set of ciphertext blocks is created by the encryptor using the pre-cipher generated in operation 506, and is communicated from the encryptor to the decryptor, as shown in operation 508. The decryptor then decrypts the ciphertext blocks using the pre-cipher generated in operation 506, thereby creating plaintext blocks (operation 512).

After creating the set of plaintext blocks, the set is examined to determine if it contains pre-cipher reconfiguration information (operation 514). The pre-cipher reconfiguration information may be used to transform the existing pre-cipher into a new pre-cipher. The new pre-cipher is used to encrypt/decrypt subsequent sets of plaintext/ciphertext blocks, until a new unit of reconfiguration information is found in a plaintext block, indicating that the pre-cipher is to be altered yet again.

Figure 6:
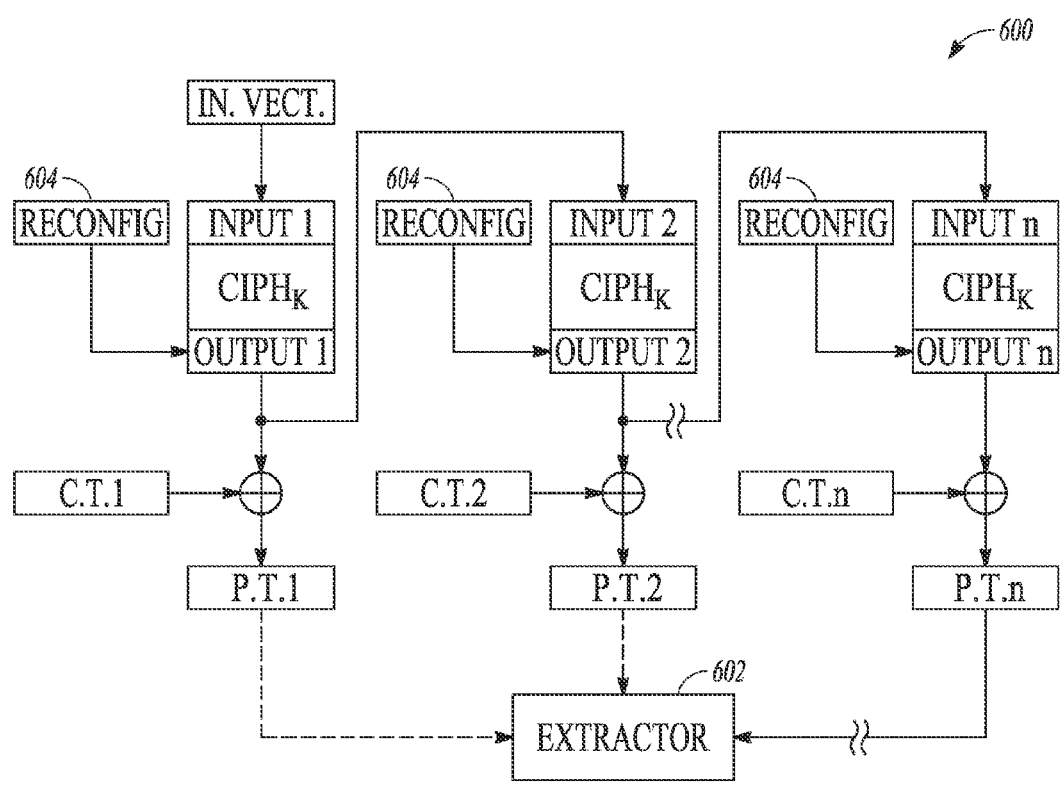
FIG. 6 depicts an example of an encryption/decryption scheme.

FIG. 6 shows a decryptor 600, which is similar to that of FIG. 1. However, the decryptor 600 includes an extractor 602 that receives one or more plaintext blocks that may contain pre-cipher reconfiguration information. The decryptor 600 of FIG. 6 contains a quantity of n cipher blocks. Assume, for example, that the encryptor reserves the last bit of the $n^{th}$ data message for transmitting a bit indicating whether the pre-cipher should be reconfigured (a "1" indicates that the pre-cipher should be reconfigured, and a "0" indicates that the pre-cipher should go unaltered). In such an example, the extractor 602 receives the $n^{th}$ plaintext block, and examines its final bit. Reconfiguration unit 604 is described in FIG. 5. If the extractor 602 observes a "1" in the final bit, then the extractor 602 communicates this information to reconfiguration units 604, which are coupled to the output stages of each cipher block. (Although FIG. 6 depicts the decryptor 600 as containing a quantity of n reconfiguration units 604—one for each cipher block—the decryptor 600 may contain a single reconfiguration unit 604 that is able to manipulate the data in the output stage of each of the cipher blocks.) The reconfiguration units 604 respond by manipulating the data in the output stages in a predefined manner, as shown in operation 515 (FIG. 5). For example, the reconfiguration units 604 may rotate the data in the output stages (i.e., the pre-cipher) a certain number of bits to the left or right, or may otherwise shuffle or rearrange the pre-cipher according to a predetermined scheme. The encryptor also contains reconfiguration units that manipulate the pre-cipher, so that the encryptor and decryptor remain synchronized with each other with respect to the pre-cipher being used to encrypt/decrypt the sets of plaintext/ciphertext blocks. Thereafter, the encryptor uses the pre-cipher generated in step 515 to encrypt subsequent blocks of plaintext, and sends the encrypted blocks to the decryptor (operation 508).

If the extractor 602 (FIG. 6) does not observe reconfiguration information and there is no more data at 516 in the final bit of the $n^{th}$ plaintext block, then flow proceeds from operation 514 to operation 518, to determine whether to exchange any additional ciphertext blocks. If so, the blocks are exchanged using the previous pre-cipher for encryption/decryption (i.e., control is passed to operation 508). If no further blocks are to be exchanged, the process ends (operation 518).

Although the above example refers to the last bit of the $n^{th}$ plaintext block as containing pre-cipher reconfiguration information, such information may be located at any pre-arranged location in the data message. Further, the pre-cipher reconfiguration information may be greater than one bit in length. For example, the pre-cipher reconfiguration information may be m bits in length. If the m bits making up the pre-cipher reconfiguration information equal zero (or any other predetermined value), then no pre-cipher reconfiguration is to be performed. On the other hand, if they equal a value other than zero, then the pre-cipher reconfiguration information is sent to the reconfiguration unit(s) 604, which use the information to determine how to manipulate the pre-cipher.

Figure 7A:
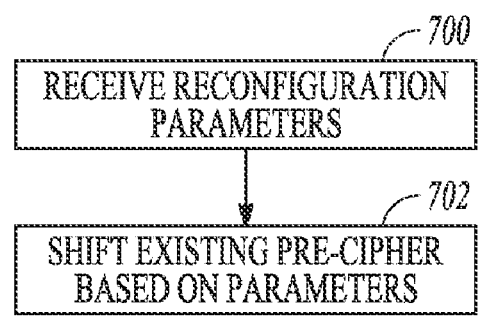
FIG. 7A depicts an example of a method of reconfiguring a pre-cipher.

For example, in FIG. 7A, the reconfiguration unit(s) 604 may receive the pre-cipher reconfiguration information at 700. Then, at 702, the reconfiguration units(s) 604 may rotate the existing pre-cipher to the left (or right) a number of bits based on the reconfiguration information (e.g., if the reconfiguration information equaled four, then the existing pre-cipher may be shifted four bits to the left).

As an alternative to the operation 702 in FIG. 7A, the reconfiguration unit(s) 604 may perform any other manipulation that is determined by the reconfiguration information. For example, the reconfiguration unit(s) 604 may flip every $j^{th}$ bit of the pre-cipher, where j is determined based on the reconfiguration information (e.g., if the reconfiguration information equaled four, then every fourth bit of the existing pre-cipher may be flipped).

As another alternative, the pre-cipher may change upon receiving each message, even in the absence of reconfiguration information. For example, the pre-cipher may be manipulated by a polynomial feedback shift register, which typically performs one shift operation per message. The structure of the polynomial shift register (i.e., the quantity and orientation of exclusive-OR operations) may be determined by the reconfiguration information. Thus, with the reception of each message, the pre-cipher changes according to the polynomial implemented by the polynomial shift register. The reconfiguration information corresponds to a new polynomial, thereby changing the structure of the polynomial shift register, and altering the particular manner in which the pre-cipher is altered in the future.

Figure 7B:
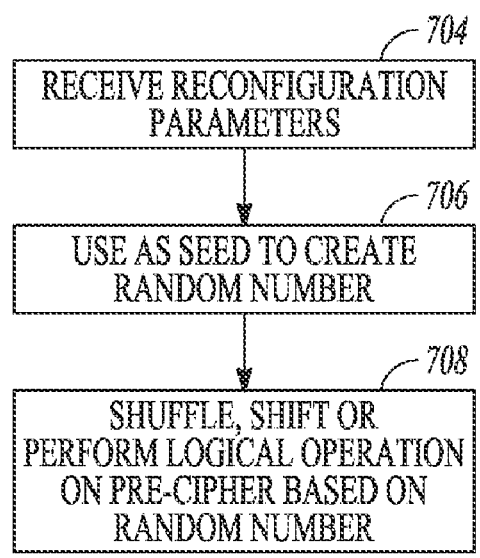
FIG. 7B depicts an example of another method of reconfiguring a pre-cipher.

Still further, in FIG. 7B, the reconfiguration unit(s) 604 may receive the pre-cipher reconfiguration information, as shown in operation 704. Next, the reconfiguration information is used as a seed that is provided to a random number generator (operation 706), thereby generating a random number. The encryptor and decryptor use the same form of random number generator, as illustrated in the example of FIG. 7B. Thereafter, the random number generated at 706 is used to determine a manipulation of the pre-cipher, such as a shuffle, shift, or other logical operation such as exclusive-ORing, ANDing and ORing (operation 708).

The encryptor may be arranged to embed reconfiguration information within a data message after a condition occurs. For example, the encryptor may embed the reconfiguration information in a plaintext block (which is subsequently encrypted by the encryptor) in the wake of having transmitted more than a threshold quantity of ciphertext blocks without having embedded such reconfiguration information. Also, the encryptor may embed the reconfiguration information upon elapse of a timer. Alternatively, the encryptor may be arranged to embed reconfiguration using a randomly generated schedule. Depending upon the quantity of bits making up the reconfiguration information, such information may be embedded within a single block or within multiple blocks.

Figure 8:
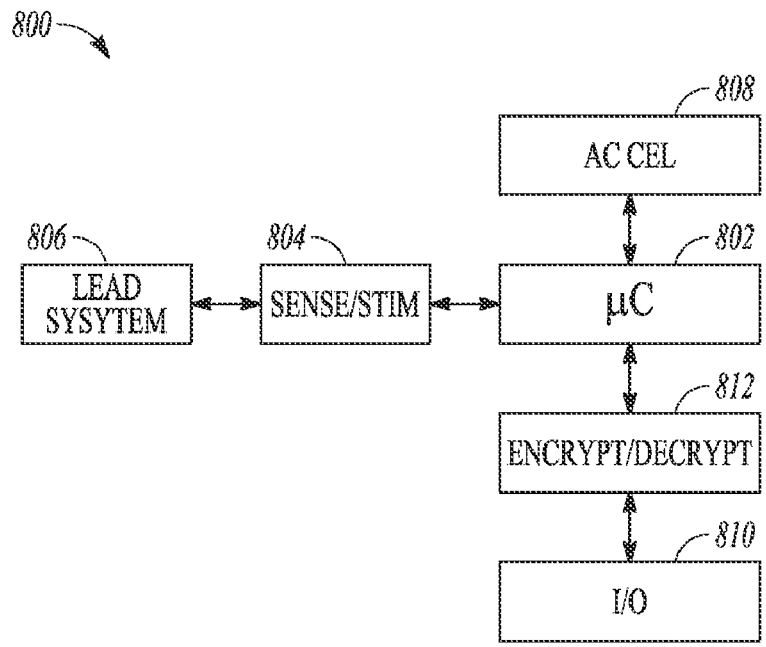
FIG. 8 depicts an example of medical device.

FIG. 8 depicts a cardiac rhythm management device 800. In this example, the device 800 includes a controller 802 that is coupled to a sense channel/stimulation channel 804, which is, in turn, coupled to an electrode system 806. The electrode system 806 may include one or more leads, each of which may contain one or more electrodes that may be implanted into (or in communication with) various chambers of a patient's heart. The controller 802 is informed of cardiac activity by the sense channel 804. The controller 802 may also cause an electrical energy to be delivered to the patient's heart through command of the electrical output channel 804.

The controller 802 may communicate with an accelerometer 808, which generates a signal indicative of physical motion of the patient's body. The controller 802 may alter a heart pacing rate using as input the signal generated by the accelerometer 808 or other sensor indicative of the patient's need.

The microcontroller may communicate data with a remote device through an input/output (I/O) channel 810. An encryption/decryption circuit 812 is located between the I/O channel 810 and the controller 802. Data output by the controller 802 and is encrypted by the encryption/decryption circuit 812 for delivery to a remote device. Data received from a remote device is decrypted by the encryption/decryption circuit 812 for delivery to the controller 802. The encryption/decryption circuit 812 operates as discussed with respect to FIGS. 5-7.

The encryption/decryption circuit 812 may be implemented as a part of the controller 802. The controller 802 may be implemented as an application-specific integrated circuit (ASIC) or as a processor in data communication with one or more memory devices. The memory devices may, for example, be programmed with firmware to implement or to cooperate with hardware in order to implement the methods and schemes presented herein. Although the exemplary device depicted herein is a medical device, the encryption/decryption schemes described herein may be used in other devices in communication with each other.

Figure 9:
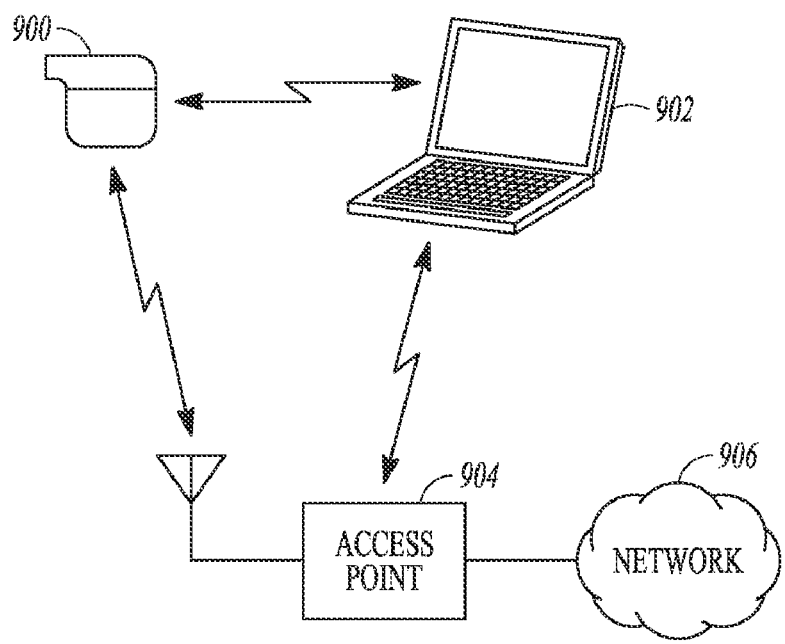
FIG. 9 depicts an example of a communication system including a cardiac rhythm management device, programmer, and wireless access point.

FIG. 9 depicts an exemplary communication system including a medical device 900 (such as the medical device 800 of FIG. 8). The medical device 900 may perform the encryption/decryption schemes described herein with a programmer 902 or a wireless access point 904 to a network 906, for example.

Embodiments of the invention may be implemented in one or a combination of hardware, firmware, and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disc storage media, optical storage media, flash-memory devices, electrical, optical, acoustical or other form of propagated signals (e.g., carrier waves, infrared signals, digital signals, etc.), and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, inventive subject matter lies in less than all features of a single disclosed embodiment. Thus, the following claims are hereby incorporated into the detailed description, with each claim standing on its own as a separate embodiment.

The claimed invention is:

1. A method comprising:
using at least one processor able to execute instructions to:
receive a cipher key;
expand the cipher key into a plurality of round keys;
create a pre-cipher, based at least in part upon the cipher key and the plurality of round keys;
receive a message comprising a plurality of ciphertext blocks;
use the pre-cipher to decrypt the plurality of ciphertext blocks, yielding a plurality of plaintext blocks;
during decryption of the message:
inspect a designated portion of the last plaintext block of the plurality of plaintext blocks to determine whether a pre-cipher reconfiguration parameter is non-zero; and
when the pre-cipher reconfiguration parameter is non-zero:
extract the pre-cipher reconfiguration parameter from the plaintext block; and
alter the pre-cipher based upon the reconfiguration parameter, to provide an altered pre-cipher.

2. The method of claim 1, wherein the instructions to receive the cipher key comprise instructions to:
transmit a public key to an external system prior to receiving the cipher key;
receive a message containing the cipher key, the message having been encrypted by the public key; and
decrypt the message with a private key, to obtain the cipher key.

3. The method of claim 1, wherein the round keys are generated by an AES key expansion algorithm.

4. The method of claim 3, wherein the pre-cipher is generated by an AES cipher algorithm.

5. The method of claim 1, wherein the instructions to alter the pre-cipher comprise instructions to shift the pre-cipher a quantity of bits determined by the parameter.

6. The method of claim 1, wherein the instructions to alter the pre-cipher comprise instructions to shuffle the pre-cipher based upon the parameter.

7. The method of claim 1, wherein the instructions to alter the pre-cipher comprise instructions to generate a pseudo-random number based upon the parameter, and use the pseudo-random number to determine a shift operation to be performed on the pre-cipher.

8. The method of claim 1, wherein the instructions to alter the pre-cipher comprise instructions to generate a pseudo-random number based upon the parameter, and use the pseudo-random number to determine a shuffle operation to be performed on the pre-cipher.

9. The method of claim 1, wherein the designated portion of the last plaintext block comprises a single bit.

10. The method of claim 9, wherein the single bit is the last bit of the last plaintext block.

11. A method comprising:
using at least one processor able to execute instructions to:
identify a cipher key;
expand the cipher key into a plurality of round keys;
generate a pre-cipher based upon the cipher key, and the plurality of round keys;
encrypt a first plurality of plaintext blocks based upon the pre-cipher yielding a plurality of ciphertext blocks;
transmit the plurality of ciphertext blocks;
detect the occurrence of a condition; and
subsequent to occurrence of the condition:
embed a pre-cipher reconfiguration parameter in a designated portion of the last plaintext block of a second plurality of plaintext blocks;
alter the pre-cipher to correspond with the reconfiguration parameter, to provide an altered pre-cipher;
encrypt the second plurality of plaintext blocks using the altered pre-cipher, to provide a plurality of ciphertext blocks encrypted with the altered pre-cipher; and
transmit the plurality of ciphertext blocks encrypted with the altered pre-cipher.

12. The method of claim 11, wherein the instructions to detect the occurrence of the condition comprise instructions to determine when more than a threshold quantity of ciphertext blocks have been transmitted.

13. The method of claim 11, wherein the instructions to detect the occurrence of the condition comprise instructions to determine when a timer has elapsed.

14. The method of claim 11, wherein the instructions to embed the pre-cipher reconfiguration parameter comprise instructions to insert the parameter into a plaintext block, encrypt the plaintext block to provide a ciphertext block, and transmit the ciphertext block.

15. The method of claim 11, wherein the instructions to embed the pre-cipher reconfiguration parameter comprise instructions to insert a plurality of parameters into a plurality of plaintext blocks, encrypt the plurality of plaintext blocks to provide a plurality of ciphertext blocks with a plurality of parameters, and transmit the plurality of ciphertext blocks with the plurality of parameters.

16. The method of claim 11, wherein using the at least one processor further comprises using the at least one processor to execute instructions to alter the pre-cipher based upon the parameter.

17. The method of claim 16, wherein using the at least one processor further comprises using the at least one processor to execute instructions to encrypt subsequent plaintext blocks using the altered pre-cipher.

18. An implantable device comprising:
a sense/stimulator channel; and
an input/output (I/O) interface; and
a controller coupled to the sense/stimulator channel and to the I/O interface, the controller being configured to:
receive physiological or behavioral data from the sensor;
receive a cipher key via the I/O interface;
expand the cipher key into a plurality of round keys;
create a pre-cipher, based at least in part upon the cipher key and the plurality of round keys;
receive a plurality of ciphertext blocks via the I/O interface;
use the pre-cipher to decrypt the plurality of ciphertext blocks, yielding a plurality of plaintext blocks;
inspect a designated portion of the last plaintext block of the plurality of plaintext blocks to determine whether a pre-cipher reconfiguration parameter is non-zero; and
when the pre-cipher reconfiguration parameter is non-zero:
extract a pre-cipher reconfiguration parameter from at least one of the plaintext blocks; and
alter the pre-cipher based upon the parameter.

19. The device of claim 18, wherein the controller is further configured to generate the round keys based upon an AES key expansion algorithm.

20. The device of claim 19, wherein the controller is further configured to generate the pre-cipher based upon an AES cipher algorithm.

21. The device of claim 18, wherein the controller is further configured to alter the pre-cipher by shifting the pre-cipher a quantity of bytes determined by the parameter.

22. The device of claim 18, wherein the controller is further configured to alter the pre-cipher by shuffling the pre-cipher based upon the parameter.

23. The device of claim 18, wherein the controller is further configured to alter the pre-cipher by generating a pseudo-random number based upon the parameter, and by using the pseudo-random number to determine a shift operation to be performed on the pre-cipher.

24. The device of claim 18, wherein the controller is further configured to alter the pre-cipher by generating a pseudo-random number based upon the parameter, and by using the pseudo-random number to determine a shuffle operation to be performed on the pre-cipher.

25. A non-transitory computer-readable medium, including instructions that, when performed by a computer, cause the computer to:
identify a cipher key;
expand the cipher key into a plurality of round keys;
generate a pre-cipher based upon the cipher key and the plurality of round keys;
encrypt a first plurality of plaintext blocks based upon the pre-cipher yielding a plurality of ciphertext blocks;
transmit the plurality of ciphertext blocks;
detect the occurrence of a condition; and
subsequent to occurrence of the condition:
embed a pre-cipher reconfiguration parameter in a designated portion of the last plaintext block of a second plurality of plaintext blocks;
alter the pre-cipher to correspond with the reconfiguration parameter, to provide
an altered pre-cipher;
encrypt the second plurality of plaintext blocks using the altered pre-cipher, to provide a plurality of ciphertext blocks encrypted with the altered pre-cipher; and
transmit the plurality of ciphertext blocks encrypted with the altered pre-cipher.

* * * * *

UNITED STATES PATENT AND TRADEMARK OFFICE
CERTIFICATE OF CORRECTION

PATENT NO.       : 8,041,032 B2                                     Page 1 of 1
APPLICATION NO.  : 11/207286
DATED            : October 18, 2011
INVENTOR(S)      : Mehdi Katoozi et al.

It is certified that error appears in the above-identified patent and that said Letters Patent is hereby corrected as shown below:

On the title page, item (56), under "Other Publications", in column 2, line 5, delete ""Reccomendation" and insert -- "Recommendation --, therefor.

On Sheet 8 of 8, Reference Numeral 806, Figure 8, line 2, delete "SYSYTEM" and insert -- SYSTEM --, therefor.

Signed and Sealed this
Tenth Day of January, 2012

David J. Kappos
*Director of the United States Patent and Trademark Office*